May 19, 1970 ITSUKI BAN 3,512,786

TAPE PLAYER UTILIZING PLURALITY OF ENDLESS MAGNETIC TAPE CARTRIDGES

Filed Nov. 19, 1968 4 Sheets-Sheet 1

INVENTOR
ITSUKI BAN
BY Jacobs & Jacobs
ATTORNEY

May 19, 1970 ITSUKI BAN 3,512,786

TAPE PLAYER UTILIZING PLURALITY OF ENDLESS MAGNETIC TAPE CARTRIDGES

Filed Nov. 19, 1968 4 Sheets-Sheet 2

INVENTOR

ITSUKI BAN

BY Jacobs & Jacobs

ATTORNEY

INVENTOR
ITSUKI BAN
BY
Jacobs & Jacobs
ATTORNEY

May 19, 1970 ITSUKI BAN 3,512,786

TAPE PLAYER UTILIZING PLURALITY OF ENDLESS MAGNETIC TAPE CARTRIDGES

Filed Nov. 19, 1968 4 Sheets-Sheet 4

INVENTOR
ITSUKI BAN
BY Jacobs & Jacobs
ATTORNEY

United States Patent Office 3,512,786

Patented May 19, 1970

3,512,786

TAPE PLAYER UTILIZING PLURALITY OF ENDLESS MAGNETIC TAPE CARTRIDGES

Itsuki Ban, 829 Higashi-Oizumi-machi, Nerima-ku, Tokyo-to, Japan

Filed Nov. 19, 1968, Ser. No. 777,029
Claims priority, application Japan, Nov. 22, 1967, 42/74,711, 42/74,712
Int. Cl. G11b *5/00*
U.S. Cl. 274—4 7 Claims

ABSTRACT OF THE DISCLOSURE

A tape player utilizing a plurality of endless tape cartridges, comprising a bottomless enclosure accommodating a plurality of endless magnetic tape cartridges in a stack, a horizontal platform receiving the lowermost cartridge falling from the lower end of said enclosure, a frame movably mounted on the upper face of the horizontal platform and holding the lowermost cartridge leaving the enclosure, frame means having a frame moving mechanism, reproducing means including reproducing members such as a capstan, a magnetic head disposed in a position to oppositely face to the leading edge of the lowermost cartridge held by the frame, whereby the lowermost cartridge is away from the reproducing means upon completion of reproduction by backward movement of the frame, the cartridge passes through an opening formed in the platform while the next cartridge is out of the enclosure by its dead load to effect reproduction of the tape in the next cartridge.

BACKGROUND OF THE INVENTION

The present invention relates to a tape player utilizing a plurality of endless magnetic tape cartridges and more particularly to such a tape player which is capable of effecting tape reproduction automatically one by one out of the enclosure in which a plurality of stack of cartridges are accommodated.

Hitherto, there has been proposed a tape player which is capable of effecting tape reproduction automatically one by one cartridges from a stack thereof. However, it is not sufficient for reasons described hereinafter. Primarily, a complex structure is required to automatically move a cartridge to be played into the play position and to allow such cartridge to be away from that position after tape reproduction. Further, it is required to provide a high output torque motor or an electromagnetic plunger separately of a capstan motor for running and driving the tape so that much current must be consumed. This is an important problem when a battery is used as a power source.

Secondarily, if a main switch is opened during tape reproduction, all functions of the player are suspended to result in that a pinch roller in the cartridge in the play position remains in its engagement with the capstan so that the pinch roller is deformed and the tape is stuck to the pinch roller or tangled to the pinch roller whereby it is torn out. Moreover, the cartridge in the play position is not in a position of so-called "exposed head" (an endless magnetic tape is so set that an initial portion is played) so that the next reproduction is not made at the beginning.

Thirdly, it is impossible to automatically select a sound track continuously if the track is plural.

The present invention is made to eliminate defects involved in the player which has been proposed so far.

SUMMARY OF THE INVENTION

It is a principal object of the present invention to provide a tape player utilizing a plurality of endless magnetic tape cartridges wherein the lowermost cartridge out of a stack thereof accommodated in the enclosure is laid on a horizontal platform and is held by a frame movably mounted on the platform, the cartridge is caused to be positioned in the play position by movement of the frame, such cartridge is further allowed to be away from the play position when the play is completed, and the successive cartridges are automatically played in succession.

A further object of the invention is to provide a tape player utilizing a plurality of endless magneic tape cartridges wherein movement of a frame for holding the cartridge to be played and for moving the same is made by the use of rotation force of a capstan whereby it is not required to provide a separate driving source to move the frame to simplify the strutcure and save current consumption.

Another object of the invention is to provide a tape player utilizing a plurality of endless magnetic tape cartridges wherein a switch is provided in parallel with a main switch for controlling current supply to the apparatus, current supply is made to a capstan motor by the switch when the main switch is opened during tape reproduction, and the switch is opened to suspend all functions of the player when the cartridge is away from the play position.

Still another object of the invention is to provide a tape player utilizing a plurality of endless magnetic tape cartridges wherein reproducing members such as a capstan, a magnetic head and others are provided on a swingable deck, the reproducing members abut against a pinch roller and the tape by cooperation of movement of the deck with the frame to play the tape as desired while the reproducing members are away from the area where the cartridge falls whenever a stack of cartridges successively falls whereby not interfering with falling of the cartride.

A still further object of the invention is to provide a tape player utilizing a plurality of endless magnetic tape cartridges wherein a rotary switch is provided to close and open switches corresponding to the respective sound tracks by rotation of a cam shaft of a magnetic head elevating element for elevating the magnetic head to reproducing each of a plurality sound tracks, a switch is also provided which is closed and opened selective and manual operation, current supply to an electromagnetic plunger for controlling movement of a frame is controlled by the rotary switch and the switch whereby a plurality of sound tracks are successively or selectively played automatically.

For a better understanding of the invention, reference is made to the following detailed description of an embodiment taken in conjunction with the accompanying drawing in which:

[redacted]

Figure 1:
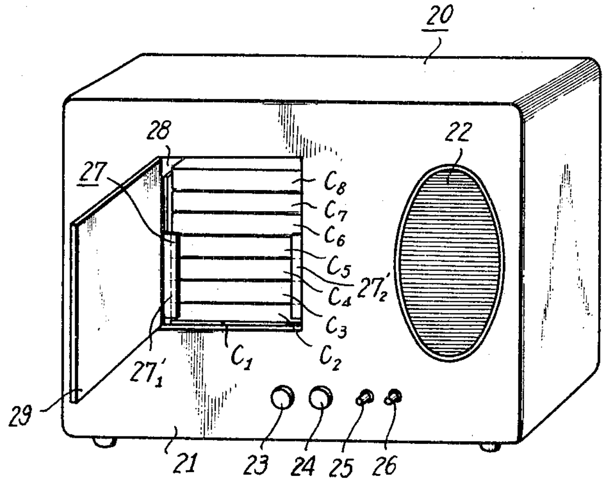
FIG. 1 is a perspective view of a tape player constructed according to the present invention.

the platform 30 to the frame 50 and of which the upper end carries a pinion gear 79. The gear 79 is pivoted to the upper face of the top plate 38 and is brought through the opening 68 into the frame 50 to engage a gear 80 secured to a top end of a shaft 81.

Figure 2:
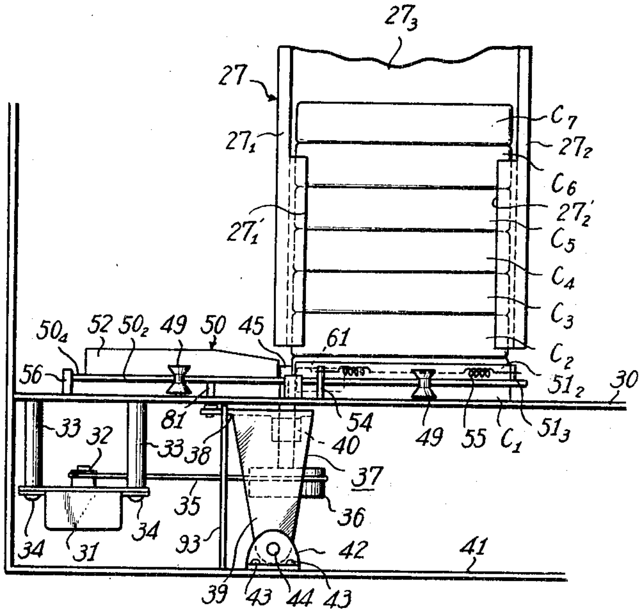
FIG. 2 is a front view showing a substantial part of the tape player mounted within a casing or cabinet, with being partly omitted away.
Figure 3:
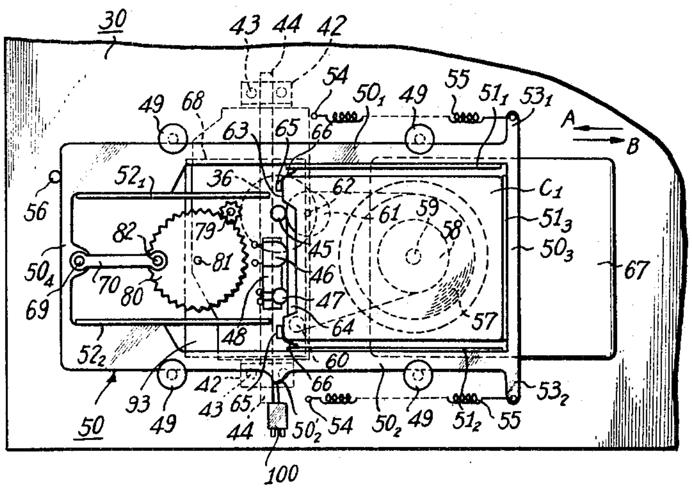
FIG. 3 is a plan view of the same without showing an enclosure of FIG. 2.
Figure 4:
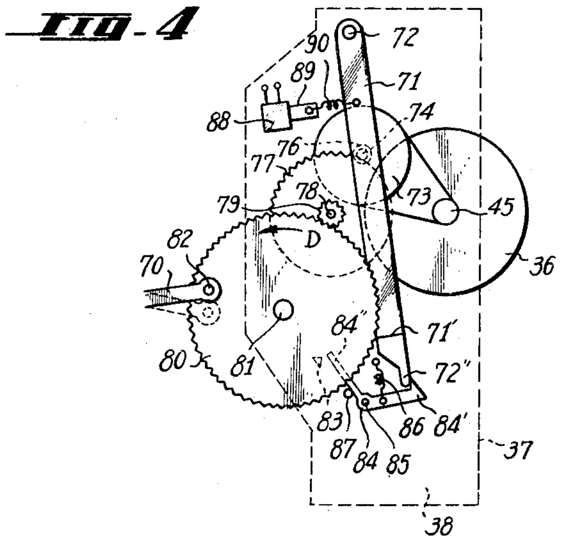
FIG. 4 is a plan view of a mechanism for driving the frame and the swingable deck as shown in FIG. 2 by rotation of the capstan.

A hooking lever 84 is pivotally mounted at a pin 85 on the top plate 38 so as to be urged counterclockwise by a spring 86. Rotation of the hooking lever 84 by the spring 86 is arrested by a stop pin 87. The lever 71 is provided at one end thereof with a hooked portion indicated at 71' and 72''. The hooked portion passes through a slit (not shown) on the top plate 38 at 71' and the end 71'' may engage the hooking lever 84 at one end 84' thereof. The other end 84'' of the hooking lever extends under the gear 80. An eletcromagnetic plunger 88 is mounted by a bracket (not shown) on the top plate 38 at the under side thereof. An armature 89 of the plunger 88 is connected by a spring 90 to the lever 71. As seen from FIG. 4, rotation of the capstan 45 is imparted through the belt, belt wheel 73, and the gear trains 76, 77, 79 to the gear 80 to allow it to be rotated in the direction of arrow D. The details of operation of the swingable deck and the frame 50 in response to rotation of the gear 80 will be described hereinafter. When the link 70 is positioned from the solid to the dotted line with rotation of the gear 80, a projection 83 mounted on the under side of the gear 80 engages and abuts against the end 84' of the lever 84 so that the lever 84 is clockwise rotated to release the lever 71 from its retention. Thus, the lever is counter-clockwise rotated by tension of the rubber belt 75. As a result, tension of the belt 75 is relieved to allow it to be slipped and mesh of the pinion 76 with the gear 77 is released to terminate rotation of the gear 80. FIGS. 2 and 3 show the relationship between parts as set forth above. The capstan 45 abuts against the tape 57 over the pinch roller 61 in the cartridge C while the magnetic head 46 engages the running tape to allow it to be played.

Figure 5:
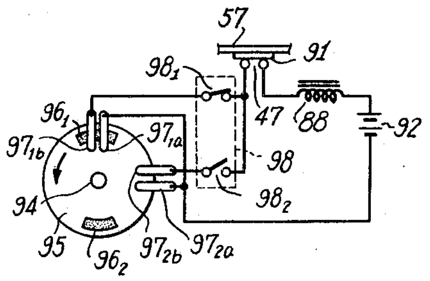
FIGS. 5 and 6 are circuits as selecting means for the sound track.

When the tape 57 completes one cycle, an end mark 91 of conductive foil on the tape short-circuits the contacts of the end mark sensor 47 as shown in FIG. 5. This causes the electromagnetic plunger 88 to be supplied with pulse-like current from a power source 92. The lever 71 is then clockwise rotated and the end 72'' thereof is engaged by the hooking lever 84. Such engagement of the lever 84 with the lever 71 is maintained until the hooking lever 84 is rotated by the projection 83 even after the electromagnetic plunger 88 is deenergized. Thus, the gear 80 is rotated by rotation of the capstan 45 in the direction of arrow D.

At the initiation of the gear 80, the swingable deck 37 is counterclockwise rotated around the shaft 44 (FIG. 2) slightly and interferes with the stop pin 93 on the bottom plate 41 so that rotation of the deck is arrested. Next, the frame 50 is moved by the link 70 in response to rotation of the gear 80 and carrying the cartridge in the direction of arrow B against bias of the spring 55 so that the cartridge falls from the opening 67 with respect to such a position when the gear 80 completes rotation of 180° from the original position shown in FIG. 3. Still further, the gear 80 is rotated to move the frame 50 in the direction of arrow A until the transverse portion $50_4$ engages the stop pin 56 to prevent movement of the frame. At this moment, the frame 50 is positioned under the enclosure 27 to allow the next cartridge to fall and to be supported by the frame. In the meantime, the gear 80 does not complete its rotation of 360° and the swingable deck 37 of which rotation is arrested by the stop pin 93 starts its rotation clockwise. When the gear 80 completes its rotation of 360°, the capstan 45 abuts against the pinch roller 61 with the magnetic head 46, end mark sensor 47 abutting against the tape 57 to initiate reproduction of the tape 57. At this time, the projection 83 in the gear 80 rotates the hooking lever 84 against bias of the spring 86 to release the lever 71 from its retention while rotation of the capstan 45 is not imparted to the belt wheel 73 to release the pinion 76 from the gear 77 so that rotation of the gear 80 is terminated. Thereafter, the tape will be reproduced. When rotation of the swingable deck 37 clockwise is effected, the guides provided on the deck 37 forcedly engage the leading edge of the cartridge so that relative positioning of the cartridge takes place with respect to the capstan 45, and the magnetic head is in place to reproduce the tape in good tone quality. Abutment of the capstan 45 with the pinch roller 61 is effected by bias of the springs 55.

From the above description, it is apparent that a stack of the cartridges placed on the enclosure 27 are adapted to be played one by one by reciprocal movement of the frame 50.

FIG. 5 is a schematic electrical diagram showing means for controlling current supply to the plunger 88 and for shifting the cartridge in which the tape includes two of the sound tracks or the channel (in case of stereo tape). In this figure, like characters of reference refer to similar parts and portions. Numeral 94 is a rotating shaft which serves as a common shaft for a rotating cam provided on conventional magnetic head elevating means having an electromagnetic plunger. A rotary switch plate 95 having conductive portions $96_1$ and $96_2$ is secure to the shaft 94. An insulated member (not shown) is provided to be opposite to the switch plate 95 and is comprised of two pairs of contacts $97_{1a}$, $97_{1b}$ and $97_{2a}$, $97_{2b}$ so as to engage the conductive portions $96_1$, $96_2$. The contacts $97_{1a}$, $97_{2b}$ are connected to each other and further connected to the negative pole of the power source 92. The contact $97_{1b}$ is connected through a switch $98_1$ and end mark sensor 47 to the positive pole of the source 92 while the contact $97_{2b}$ is connected through a switch $98_2$ and end mark sensor 47 to the same. The switches $98_1$ and $98_2$ each correspond to the respective switches of alternative switch 98 and either one of the switches is closed to open the other one. Numerals 25, 26 indicate push buttons for the switches shown in FIG. 1. Reproduction of the first track is effected by short-circuiting the contacts $97_{1a}$, $97_{1b}$ by the conductive portions $96_1$. Upon completion of reproduction of the first track and the end mark 91 short-circuits the contacts of the end mark sensor 47, the electro-magnetic plunger (not shown) for magnetic head elevating means is energized to rotate the rotating cam (not shown) to thus allow the magnetic head to shift from the first to the second track. At the same time, the electromagnetic plunger 88 is energized if the switch $98_1$ is closed as shown to rotate the lever 71 (FIG. 4) to be engaged with the hooking lever 84 so that the frame 50 startsits movement to take out the cartridge in which the tape has been reproduced from the frame while the next cartridge is supported thereby. This will enable the next cartridge to initiate its reproduction.

On the contrary, when the other switch $98_1$ is opened and the switch $98_2$ is closed, the plunger 88 is not energized if the end mark 91 short-circuits the contacts of the sensor 47 upon completion of the first track and the frame 50 is at a standstill while the plunger (not shown) for magnetic head elevating means is energized to allow the magnetic head to shift to the second track. Thus, the second track will be reproduced. Upon the shift of the magnetic head to the second track, the rotary switch plate 95 is rotated in the direction of the arrow at an angle of 90° and the conductive portion $96_2$ short-circuits the contacts $97_{1a}$, $97_{2b}$.

When the second track completes its reproduction, the plunger 88 is energized to move the frame 50 providing the successive cartridge for reproduction. The successive cartridge enables the first track to be reproduced.

From the description in the above, it is apparent that when either one of the alternative switches, namely the switch $98_1$ corresponding to the first track is closed, the next cartridge is drawn out and when the switch $98_2$ corresponding to the second track is closed, the successive cartridge is automatically drawn out upon completion of reproduction of the second track.

Figure 6:
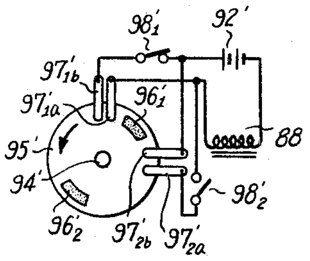

FIG. 6 shows another form of the circuit of FIG. 5 to be used for the same purpose. Like characters of reference in which a dash is put refer to similar parts and portions. FIG. 6 also shows that the first track is reproduced. The conductive portions $96'_1$ and $96'_2$ are positioned mediate between the contacts $97'_{1a}$ and $97'_{1b}$, and $97'_{2a}$ and $97'_{2b}$. When the first track is reproduced, magnetic head elevating means (not shown) is actuated to effect reproduction of the second track. At this point, the rotary switch plate 95' is rotated in the direction of the arrow at an angle of 90° to allow the conductive portion $96'_1$ to short-circuit pulses the contacts $97'_{1a}$, $97'_{1b}$ and the plunger is energized if the switch $98'_1$ is closed to draw out the next cartridge. By closing the switch $98'_1$, the next cartridge is drawn out upon completion of reproduction of the first track. If the next cartridge is desired to be played after the second track has been played, suffice it to say that the switch $98'_2$ is closed. Should the switches $98'_1$ and $98'_2$ be alternative switches, the operation is the same as that of FIG. 5.

The four tracks or channels (in case of stereo tape) may be used for embodiments as set forth hereinbefore.

Referring to FIG. 6, a current supply circuit is shown that is used for a reproducing amplifier in which the output of the capstan motor 31 (FIG. 2) and the magnetic head 46 (FIG. 3) is amplified to produce reproduced sound through the speaker 22 (FIG. 1). The motor 31 is connected through switches 99, 100 connected in parallel with each other to a power source 101 while an amplifier 102 is connected through the switches 99, 100 to a power source 101. The switch 99 is also the main switch operable by the knob 23 as the volume control. The switch 100 is mounted on the horizontal platform 30 serving as the microswitch which is operable by the projection $50'_2$ formed of the longitudinal member $50_2$ at the mid-portion thereof. The switch 100 is adapted to be closed only when the frame 50 is directly under the enclosure 27. Upon closing the switch 99, the motor 31 and the amplifier 102 are supplied with current to perform reproducing operation as desired. For example, during reproduction, if the switch 99 is opened, the motor 31 and the amplifier are continuously supplied with current to thus maintain reproduction. The frame 50 initiates its movement in the direction of arrow B by means of the end mark signal, and the switch 100 is not operated by the projection $50'_2$ so that the switch 100 is opened to deactuate the motor 31 and the amplifier 102 and all performance is completed. At this moment, the pinch roller 61 in the cartridge under reproduction is away from the capstan 45, and the pinch roller 61 cannot be deformed by engagement with the capstan 45. If the projection $50'_2$ is formed longer with respect to the longitudinal direction and the switch 100 is opened at a position where the frame 50 is moved in the direction of arrow B to a critical extent, an entire operation is completed when the cartridge is taken out from the opening 67.

Next, the switch 99 is closed, and the motor 31 is again actuated to effect reproduction as desired.

Figure 7:
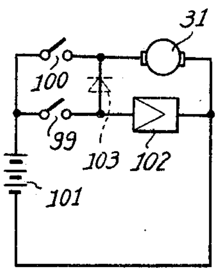

A diode 103 indicated by the dotted line may be incorporated in the circuit shown in FIG. 7 so that the amplifier 102 is deactuated and the motor 31 is actuated when opening the switch 99 thereby the tape is fed until the frame 50 is moved by the end mark signal while reproducing sound is interrupted. In other words, reproduction is terminated by opening the switch to provide advantage for use. Resistors are provided in parallel with the diode 103 to reduce the sound output to identify the opening of the switch 99.

According to embodiment shown in FIGS. 1 to 7, inclusive, since the plunger 88 is deactuated during reproducing the tape reproduction, current consumption is small and ratio of negative and positive pole is improved. Typically, movement of the frame 50 requires a driving source having a powerful torque, according to the present invention, the frame 50 is sufficiently moved by utilizing deceleration of rotation of the capstan 45.

Figure 8:
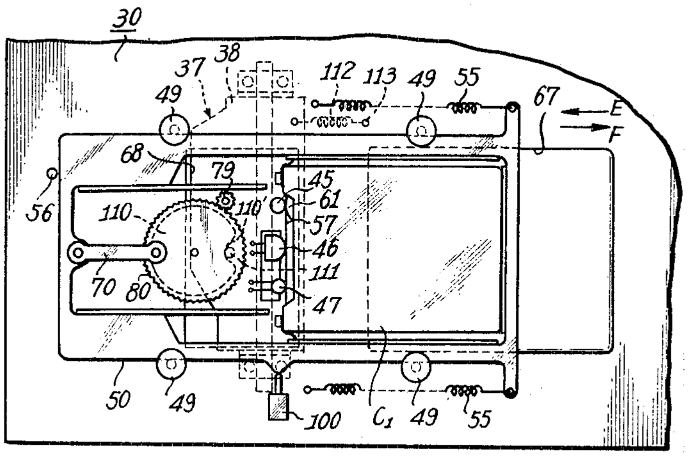

Another embodiment of the present invention is shown in FIG. 8 in which like figures are represented by like reference numerals. The structure different from the above described embodiment is as follows:

A circular cam 110 is coaxially mounted on the gear 80 at the underside thereof and is syncronously rotated with the gear 80. A pin 111 is mounted on the bottom plate and passes through the aperture (not shown) in the deck 37 and the opening 68 in the horizontal platform 30 so as to engage the periphery of the cam 110 within the upper chamber. A spring 112 extends between the swingable deck 37 and a pin 113 under the platform 30 to urge the deck 37 in the rightward direction allowing the periphery of the cam 110 to abut against the pin 111. As shown, the pin 111 is received by the notch 110' of the cam 110 so that the deck 37 is critically swung in the rightward direction and the capstan 45 abuts against the pinch roller 61 to feed the tape 57 while the magnetic head 46, the end mark sensor 47 abut against the tape to effect reproduction. Abutment of the capstan against the pinch roller 61 is derived from the springs 55 provided on the frame 50.

The gear 80 is rotated by the end mark signal as in the manner of the above mentioned embodiment, the notch 110' is away from the pin 111 and the pin 111 engages the periphery of the cam 110 so that the deck 37 is swung in the leftward direction. Thus, the capstan 45 and the other reproducing member are away from the cartridge to terminate reproduction. If elasticity of the spring 112 is greater than that of the spring 55, further rotation of the gear 80 moves the frame 50 in the direction of arrow F by guides 49 and the cartridge is taken out of the opening 67 in a position where the gear is rotated at an angle of 180°. Still further rotation of the gear 80 moves back the frame 50 in the direction of arrow E and the next cartridge falls into and is retained by the frame 50 prior to rotation of 360° with respect to the gear 80. The gear 80 is fully rotated at angle of 360°, and then rotation thereof is terminated. At this moment, the pin 111 is received in the notch 110' so that the deck is swung in the rightward direction and the capstan 45, the other reproducing member abut against the pinch roller and the tape within the next cartridge to initiate reproduction.

Figure 9:
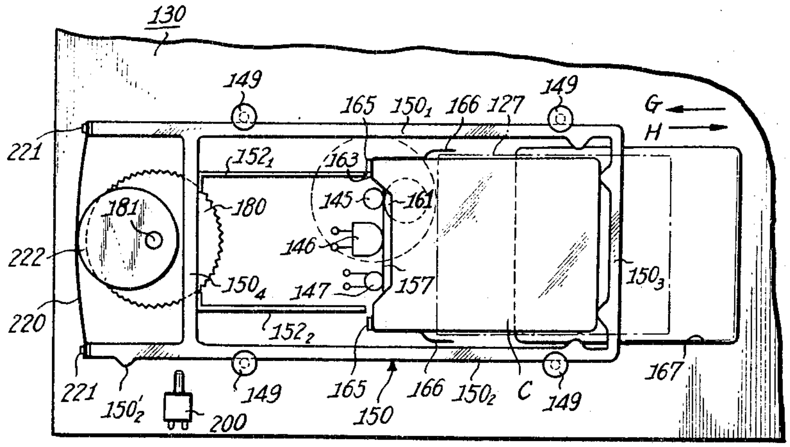

FIG. 9 shows another embodiment of the present invention in which a swingable deck is not employed. Like figures are represented by adding 100 to reference numerals in FIGS. 1 to 8.

A frame 150 which is movable in the direction of arrow G. H is supported by guides 149 on a platform 130 dividing the cabinet into a lower and upper chamber. The left ends of the longitudinal members $150_1$ and $150_2$ of the frame 150 project from the transverse member $150_4$. A leaf spring 220 is mounted by flange pins 221 on the left ends of the longitudinal members $150_1$ and $150_2$. Interposed between the transverse member $150_4$ and the leaf spring 220 is a circular eccentric cam 222 which is pivotally mounted on a shaft 181 of a spur gear 180. Thus, rotation of the eccentric cam 222 with the gear 180 causes the periphery of the cam 222 to engage the spring 220 moving the frame 150 in the direction of arrow G and to engage the transverse member $150_4$ moving the frame in the direction of arrow H. The gear 180 is rotated by the same drive mechanism as that shown in FIG. 4, namely, it is rotated by rotation of the capstan 145. The details of the gear drive mechanism is not illustrated in FIG. 8. However, suffice it to say that such the mechanism is provided on the platform 130. Elongated rods $152_1$ and $152_2$ corresponding to the bend portions $52_1$ and $52_2$ in the embodiment as described hereinbefore, are mounted on the transverse member at the inner side thereof.

As shown, a pinch roller 161 in the cartridge C held by the frame 150 on the platform 130, abuts against a capstan 145 to transport a tape 157 while a magnetic head 146 and an end mark sensor 147 engage the tape 157 to effect tape reproduction. An enclosure accommodating a plurality of the cartridges in a stack is positioned not above the cartridge in the play position but at 127 as indicated by a dotted and broken line. When tape reproduction is completed and the eccentric cam 222 is rotated by the end mark signal, the periphery of the cam is away from the leaf spring 220 to engage the transverse member $150_4$ moving the frame 150 in the direction of arrow H. With movement of the frame 150, the elongated rods $152_1$, $152_2$ urge against the leading edge 153 of the cartridge to move the latter in the direction of arrow H. At a position where the frame 150 is moved to a critical extent, namely, the eccentric cam 222 makes half revolution, the cartridge C reaches an aperture 167 formed in the platform 130 so that the cartridge falls into a lower chamber. Further rotation of the eccentric cam 222 allow the periphery thereof to engage the leaf spring 220 moving the frame 150 in the direction of arrow G. Still further rotation of the cam 222 causes the one ends of the rods $152_1$ and $152_2$ to pass under the left side of the enclosure 127 so that the next cartridge (not shown) falls in the platform 130. Movement of the frame 150 allows the next cartridge to be urged by the transverse member $150_3$ moving the next cartridge in the direction of arrow G. The next cartridge is guided by guides 166 in such a manner that the corners of the leading edges of the cartridge is moved by the guides mounted on the brackets 165 on the platform 130. At a position where the eccentric cam 220 makes nearly one revolution, the pinch roller in the next cartridge abuts against the capstan 145 while the tape engages the magnetic head 146 and the end mark sensor 147. At this point, the frame 150 is at a standstill while the leaf spring 222 is slightly deformed. Rotation of the cam 222 is terminated when it makes full one revolution. In this manner, the next cartridge is played accordingly. Abutment of the capstan with the pinch roller is effected by elasticity derived from deformation of the leaf spring 220.

A switch 200 provided on the platform 130 corresponds to the switch 100 in FIG. 8 and is a normally closed type switch. The switch 200 is opened when it is operated by the projection $150'_2$ of the longitudinal member $150_2$. The operation of the switch 200 is the same as that of the switch 100 in FIG. 8.

From the foregoing description, it is apparent that a stack of the cartridges are played in succession as in the manner illustrated in FIGS. 3 and 8.

The circuits shown in FIGS. 5 and 7 may be applied to the embodiment in FIG. 9.

Since the cartridge in the play position is loaded with a stack of another cartridges accommodated in the enclosure, much strength is required to move the frame. If the number of the cartridges grows, more strength is needed. In view of the fact as mentioned, a mechanism shown in FIGS. 10 and 11 is provided so that the cartridge in the play position is not so much loaded that less strength is required to move the frame.

Figure 10:
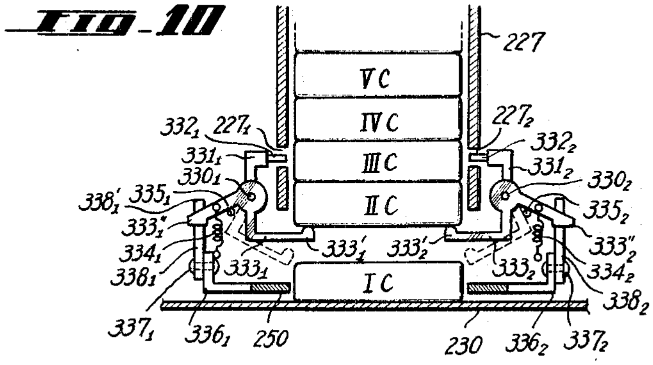

Referring to FIG. 10, numerals 227 denotes an enclosure accommodating a plurality of cartridges IC, IIC . . . . Apertures $227_1$ and $227_2$ are formed in the side walls with respect to the travel path of a frame 250 movably supported on a platform 230. A pair of levers $331_1$ and $331_2$ are rotatably supported by respective shafts $330_1$ and $330_2$ which are secured to a bracket (not shown) on the platform 230. A pair of lock members $332_1$ and $332_2$ of rubber or the like are mounted on the ends of the levers $331_1$ and $331_2$ and engage into the apertures $227_1$ and $227_2$. Another pair of levers $333_1$ and $333_2$ are rotatably pivoted to the respective shafts $330_1$ and $330_2$ and the ends of the levers $333_1$, $333_2$ are in the proximity of the enclosure 227 under thereof to prevent the cartridge accommodated in the enclosure from falling. The lever $333_1$ is counterclockwise rotatable by bias of a spring $334_1$ while the other lever $333_2$ is clockwise rotatable by bias of a spring $334_2$. Stop pins $335_1$ and $335_2$ are provided to prevent these levers from their rotation so that the ends $333'_1$ and $333'_2$ are in the proximity of the enclosure 227. Another ends $333''_1$ and $333''_2$ of the levers $333_1$ and $333_2$ are in the proximity of the travel path of levers $338_1$ and $338_2$ rotatably pivoted by shafts $337_1$ and $337_2$ to flange portions $336_1$ and $336_2$ formed in the frame 250 movable along the platform 230. The details of the levers $331_1$, $333_1$, $338_1$ are illustrated in FIG. 11. The lever $338_1$ is urged by a spring (not shown) in the direction of arrow I and rotation thereof is prevented by engagement of a pin $339_1$, secured to the lever $338_1$ with the flange portion $336_1$. Thus, the lever $338_1$ is adapted not to be rotated in the direction of arrow 1 but to be freely rotated in the reverse direction.

When the cartridge IC in FIG. 10 completes its tape reproduction and the frame 250 initiates its movements, the lever $338_1$ is moved in the direction of arrow J with the frame to allow the end $338'_1$ to engage the end $333''_1$ of the lever $333_1$. At this time, the lever $338_1$ is freely rotated in the direction reverse to that of arrow I so that it does not act upon the lever $333_1$. When the frame 250 is moved to a critical extent to take out the cartridge IC downwardly of the platform 230 as mentioned hereinbefore, the frame 250 is moved in the reverse direction to move the lever $330_1$ in the direction of arrow K. When the frame 250 reaches right under of the enclosure 227, the inclined portion of the end $338'_1$ of the lever $338_1$ engages the end $333''_1$ of the lever $333_1$ to cause the lever $333_1$ to be rotated against bias of the spring $334_1$. With rotation of the lever $333_1$, the lever $331_1$ is also rotated through a spring 340 extending between the lever $333_1$ and $331_1$. Accordingly, the lock member $332_1$ of the lever $331_1$ passes through the aperture $227_1$ into the enclosure and abuts against the one side of the cartridge IIIC while the end $333'_1$ of the lever $333_1$ is retracted from the enclosure thereunder as shown by dotted line in FIG. 10. The levers $331_2$ and $332_2$ are similarly operated. As a result, the cartridge IIC falls from the enclosure 227 into the platform 230. Further movement of the frame 250 causes the lever $338_1$ to release from the lever $333_1$ so that the lever $333_1$ is returned to its original position by bias of the spring $334_1$ while the lever $331_1$ is returned to its original position by engagement of the sleeve $333_a$ of the lever $333_1$ with the sleeve $331_a$ of the lever $331_1$. Accordingly, the cartridge IIIC prevented from its falling by the lock members $332_1$ and $332_2$ may fall due to its disengagement, however, the ends $333'_1$ and $333'_2$ of the levers $333_1$ and $333_2$ occupy under the enclosure 227 so that the cartridge IIIC is retained at a position of the cartridge IIC as shown in FIG. 10.

Figure 11:
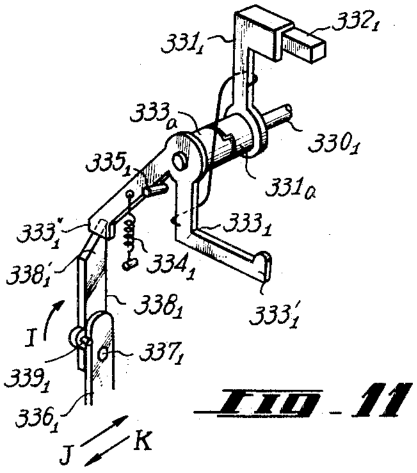

From the foregoing, it is apparent that the advantage derived from employment of the mechanism shown in FIGS. 10 and 11 is that less strength is required to move the frame since the cartridge laid on the platform 230 is not loaded with the other cartridges.

According to the embodiments as fully described, the capstan is adapted to include the flywheel. However, a motor having a shaft serving as the capstan may be used not to need the flywheel.

Although the invention has been described with reference to the accompanying drawings, it is apparent that many modifications may be made, and accordingly, it is intended that the scope of the invention be limited only as defined in the following claims.

What is claimed is:

1. A tape player utilizing a plurality of endless magnetic tape cartridges for reproducing a stack of plurality of cartridges from the lowermost to the uppermost in succession in a bottomless enclosure, comprising a horizontal platform, an upper and lower chamber separated thereby; said platform having an opening larger than the cartridge, a stack of plurality of the cartridges accommodated in the bottomless enclosure and vertically located relative to the platform within the upper chamber so as to include a space larger than the thickness of the cartridge a reproducing member including a rotatable capstan extending through the platform into the upper chamber, a magnetic head located in the upper chamber, an end mark sensor located in the upper chamber for sensing an end mark provided on the tape to produce a signal for completion of reproduction, means connected to the capstan and located in the lower chamber to rotate said capstan; frame means including a movable frame provided between the platform and the enclosure for retaining the loaded lowermost cartridge for taking it out of the enclosure downwardly thereof, a driving member actuated in response to the signal for completion of reproduction to reciprocally move the frame along the upper surface of the platform between a first position and second position, said frame being caused to be moved to said first position thereby, a pinch roller stored in the cartridge abutting against the tape over the capstan while the tape engages the magnetic head and the end mark sensor to effect tape reproduction, said end mark sensor sensing the end mark whereby the driving member is actuated in response to the signal for completion of reproduction to allow the frame to be moved to said second position so that the cartridge is discharged through the opening to the lower chamber, the frame being returned from said second position to said first position to deactuate the driving member to thereby effect the next cartridge reproduction.

2. A tape player utilizing a plurality of endless magnetic tape cartridges as set forth in claim 1, wherein the driving member for said frame means comprises a belt wheel belt driven by rotating force of the capstan of said reproducing member, a rotating member moving the frame one reciprocation by moving the former one revolution, a gear train connecting a belt wheel to the rotating member, a control mechanism for controlling power transmission between the capstan and the rotating member.

3. A tape player utilizing a plurality of endless magnetic tape cartridges as set forth in claim 2, wherein said controlling mechanism includes a swingable first lever one end of which is pivoted for rotatably supporting the belt wheel, a swingable second lever engaging the first lever against bias of tension of the belt extending between said capstan and said belt wheel, a spring urged in the direction for engaging the second and first lever, an abutting member abutting the second lever when said rotating member is rotated to rotate the second lever against bias of the spring and rotatable synchronously with the rotating member releasing the first lever from engagement, and an electromagnetic plunger having an armature coupled to said first lever and for swinging the first lever to allow the first lever to engage the second lever again when said plunger is energized by the source of power in response to said signal for completion of reproduction.

4. A tape player utilizing a plurality of endless magnetic tape cartridges as set forth in claim 2, wherein the driving source rotating the capstan of said reproducing member is a motor, a first switch manually operated and a second switch operated by said frame incorporated in a current supply circuit for said motor, the motor being supplied with current through only the second switch after opening of the first switch, and the second switch being opened to break off current supply to the motor at a position where the frame is moved from said first position in response to the signal for completion of reproduction.

5. A tape player utilizing a plurality of endless magnetic tape cartridges as set forth in claim 3, wherein said signal for completion of reproduction is supplied to the electromagnetic plunger for said frame driving member through a rotary switch operated by rotation of a cam shaft moving the magnetic head to correspond to a plurality of sound tracks on the tape, said rotary switch having a group of switch contacts corresponding to respective sound tracks, and through an alternative selection switch manually operated and having a group of switch contacts connected in series with each switch contact of said rotary switch.

6. A tape player utilizing a plurality of endless magnetic tape cartridges as set forth in claim 3 wherein the capstan, the magnetic head, and the end mark sensor for said reproducing member are a swingable deck swingably provided in the lower chamber, said capstan, magnetic head, and end mark sensor being positioned through an opening formed of said horizontal platform within the upper chamber while said frame driving member is provided on the swingable deck, the swingable deck being driven by said frame driving member, the swingable deck advancing toward the cartridge held by the frame when tape reproduction to effect tape reproduction and being retracted when completion of tape reproduction.

7. A tape player utilizing a plurality of endless magnetic tape cartridges as set forth in claim 1 wherein said enclosure includes cartridge discharge control means comprising a swingable detent lever of which one end is in proximity to the underside of the enclosure and prevents the cartridge from falling; a swingable abutting lever engageable with the detent lever and of which one end extends into the enclosure through an aperture formed therein, a spring urging the latter lever to allow the end of said detent lever to be in the proximity of the underside of the enclosure, a lever movable with the frame for swinging said detent lever against bias of the spring when the enclosure is moved from said second position to said first position, said last mentioned lever swinging the detent lever whereby the end of said detent lever is retracted from the underside of the enclosure to allow the lowermost cartridge in the enclosure to fall while the end of the abutting lever abuts against the sides of the next cartridge above the lowermost cartridge to prevent the next cartridge from falling, the detent lever being returned to its original position when said last mentioned lever passes through and the next cartridge is prevented from falling by the detent lever.

References Cited

UNITED STATES PATENTS

| | | | |
|---|---|---|---|
| 3,440,359 | 4/1969 | Page et al. | 274—4 |
| 3,437,762 | 4/1969 | Lear et al. | 179—100.2 |
| 3,424,393 | 1/1969 | Goodell et al. | 242—55.13 |
| 3,343,687 | 9/1967 | Deighton et al. | 242—55.13 |
| 3,247,328 | 4/1966 | Mitchell et al. | 179—100.2 |
| 3,188,091 | 6/1965 | Goodell | 274—11 |
| 3,127,178 | 3/1964 | Osborne et al. | 274—11 |
| 3,083,269 | 3/1963 | Gaubert | 179—100.2 |
| 3,009,024 | 11/1961 | Eash. | |

HARRY N. HAROIAN, Primary Examiner

U.S. Cl. X.R.

274—11